US007536815B2

(12) United States Patent
Cheung

(10) Patent No.: US 7,536,815 B2
(45) Date of Patent: May 26, 2009

(54) SIGN ASSEMBLAGE

(75) Inventor: Kin Ngam Cheung, Hong Kong (HK)

(73) Assignee: King's System (Hong Kong) Limited, Hong Kong (HK)

( * ) Notice: Subject to any disclaimer, the term of this patent is extended or adjusted under 35 U.S.C. 154(b) by 0 days.

(21) Appl. No.: 11/530,032

(22) Filed: Sep. 8, 2006

(65) Prior Publication Data

US 2007/0056198 A1 Mar. 15, 2007

(30) Foreign Application Priority Data

Sep. 15, 2005 (HK) .............................. 05108089.0

(51) Int. Cl.

| | |
|---|---|
| ***A47G 1/06*** | (2006.01) |
| ***G09F 7/00*** | (2006.01) |
| ***G09F 7/06*** | (2006.01) |
| ***G09F 13/04*** | (2006.01) |
| ***F16L 3/22*** | (2006.01) |
| ***F16L 3/08*** | (2006.01) |
| ***A47G 1/10*** | (2006.01) |

(52) U.S. Cl. ............................ 40/791; 40/568; 40/585; 40/611.06; 40/620; 40/622; 248/68.1; 248/74.1; 248/74.2; 248/316.7; 248/316.1

(58) Field of Classification Search .................. 40/791, 40/618, 568, 585, 611.06, 620, 622, 574; 248/68.1, 74.1, 316.7, 316.1
See application file for complete search history.

(56) References Cited

U.S. PATENT DOCUMENTS

| | | | | |
|---|---|---|---|---|
| 2,746,189 | A | 5/1956 | Bass | |
| 2,879,614 | A | 3/1959 | Baldanza | |
| 3,419,979 | A * | 1/1969 | McVicker et al. | 40/618 |
| 3,529,373 | A * | 9/1970 | Helmer | 40/618 |
| 4,669,210 | A | 6/1987 | Van Erum | |
| 5,343,646 | A * | 9/1994 | Cobb et al. | 40/585 |
| 6,421,940 | B1 * | 7/2002 | Cobb et al. | 40/611.01 |

* cited by examiner

*Primary Examiner*—Paul N Dickson
*Assistant Examiner*—Syed A Islam
(74) *Attorney, Agent, or Firm*—Jacqueline C. Lui; Eagle IP Limited

(57) ABSTRACT

A sign system with a frame and at least one sign. The sign has at least one protruding ridge extending from the backside with the ridge having a narrow neck portion proximate the backside. At least one clamping unit is fixed to the frame with at least one pair of clamps to securely the neck portion of the ridge such that the frame is reversibly but securely fastened to the frame.

6 Claims, 7 Drawing Sheets

44
44a
44a
43

46

46
46b
46a
44a
44
44a 46
44

46
44

SIGN ASSEMBLAGE

FIELD OF INVENTION

This invention relates to a sign system, and in particular an easily removable sign system for ease of replacement and handling.

BACKGROUND OF INVENTION

Signs, in particularly signs that are used in buildings with multiple tenants, are known to have a frame with replaceable sign strips for ease of replacement. For example, FIG. 1 shows a prior art wall-mounted sign system that has a pair of wall mounted columns 20 adapted to allow the directory panel or sign strips 22 to be clamped thereon via brackets 24 attached to the back of the strips. The sign strips in this example have to be removed from the top one by one, such that if a strip from the bottom of the stack of strips needs to be changed, all the strips have to be removed by sliding upwards from columns 20.

In another prior art example as shown in FIGS. 2A and 2B, The sign strips 26 are mounted onto the wall-mounted column 28 via clips 30 that have a cross-section shape generally of a semi-circle. The sign strips 26 have flanges 32 adapted to grip onto the clips. These strips may be plugged out from the columns individually from the front, but due to wide flanges 32 used for mounting to the clips 30, a big gap has to be provided between sign strips to provide sufficient space for access and removal from the front 26*a*

In some prior art methods the sign strips are difficult to mount and demount, while in other prior art methods, the signs are too readily pried off.

SUMMARY OF INVENTION

In the light of the foregoing background, it is an object of the present invention to provide an alternate sign assembly.

Accordingly, the present invention, in one aspect, provides a sign system comprising a frame and at least one sign with a front side and a back side. The sign has at least one protruding ridge extending from the backside with the ridge having a narrow neck portion proximate the backside. At least one clamping unit is also provided with at least one pair of clamps, with the clamping unit fixed onto the frame, and the clamps adapted to receive and clasp the ridge such that the clasping edge of the each clamp extends securely into the neck portion of the ridge wherein the edges of the pair of clamps grip the neck portion in opposing sides when the sign is fixed onto the frame such that the frame is reversibly but securely fastened to the frame.

In the preferred embodiment, the clamping unit comprises a base adapted for attachment to the frame, with the clamps extending from the base. The clamping unit further comprises struts extending from the base on either side of the clamps, the struts adapted to abut against the sign when the ridge is fastened to the clamps such that the sign is in the desired alignment position. In the most preferred embodiment, the struts from either side of the clamps are of the same length such that the plane of the sign is precisely aligned with the plane of the frame when attached thereto.

In another preferred embodiment, the pair of clamps protrudes from the base at an inclined angle and tilting towards each other to create a narrow entrance with an expanding space therebetween, such that the ridges may be inserted into the expanding space with the neck extending through the narrow entrance when the sign is inserted into the clamping unit.

In yet another preferred embodiment, the traverse cross section of the ridge is in the general shape of a diamond with one end of the diamond attached to the sign to form the neck. In the most preferred embodiment, the distal end of the diamond points away from the sign and the proximal end are attached to the sign to form the neck. The diamond shaped-ridge further comprises an enlarged mid-section whereby the distal end and the mid-sections are inserted into the expanding space when the sign is attached to the clamping unit.

There are many advantages to the present invention. The neck portion of the fastening member at the back of the sign allows slight angular motions of the sign such that it can be pried from the frame for ease of replacement. In the most preferred embodiment, the ridge or ridges run along the interior area of the sign, acting as the center of rotation for the sign to rotate during the removal process. Yet the neck portion also allows the clamps to tightly secure the sign to the wall frame. In another embodiment, one or more ridges are provided along the interior surface of the back of the strip, keeping the edges of the strip approximately the same thickness as the interior.

In the preferred embodiment, the two clamps are arranged to grip the sign from the two sides of the ridge that is parallel to the longitudinal edge of the sign such that the rotational movement of the sign as it is detached from the frame results in a force having the same direction as the clamping force of the clamps, thereby reducing the clamping force and making the removal process easier without causing damage to the clamps.

Another advantage of the present invention is that the ridges are preferably provided within the interior areas of the sign such that there are no flanges along the edge of the sign as found in the prior art assembly shown in FIGS. 2A and 2B. As a result, the gap between the strips may be substantially narrowed because more space is needed for the rotation of the prior art strip with a wide flange to clear away from an adjacent strip by rotational movement. The possibility of aligning the strips one next to another in a compact manner according to the present invention with virtually invisible gaps therebetween improves the aesthetic appearance of the sign assembly.

BRIEF DESCRIPTION OF FIGURES

In FIG. 2B, 3 different signs of varying heights are shown FIG. 3 shows a frame according to one embodiment of the present invention with two clamping units provided thereon. An enlarged view of one corner of the frame is also shown.

DETAILED DESCRIPTION OF THE PREFERRED EMBODIMENTS

Figure 1:
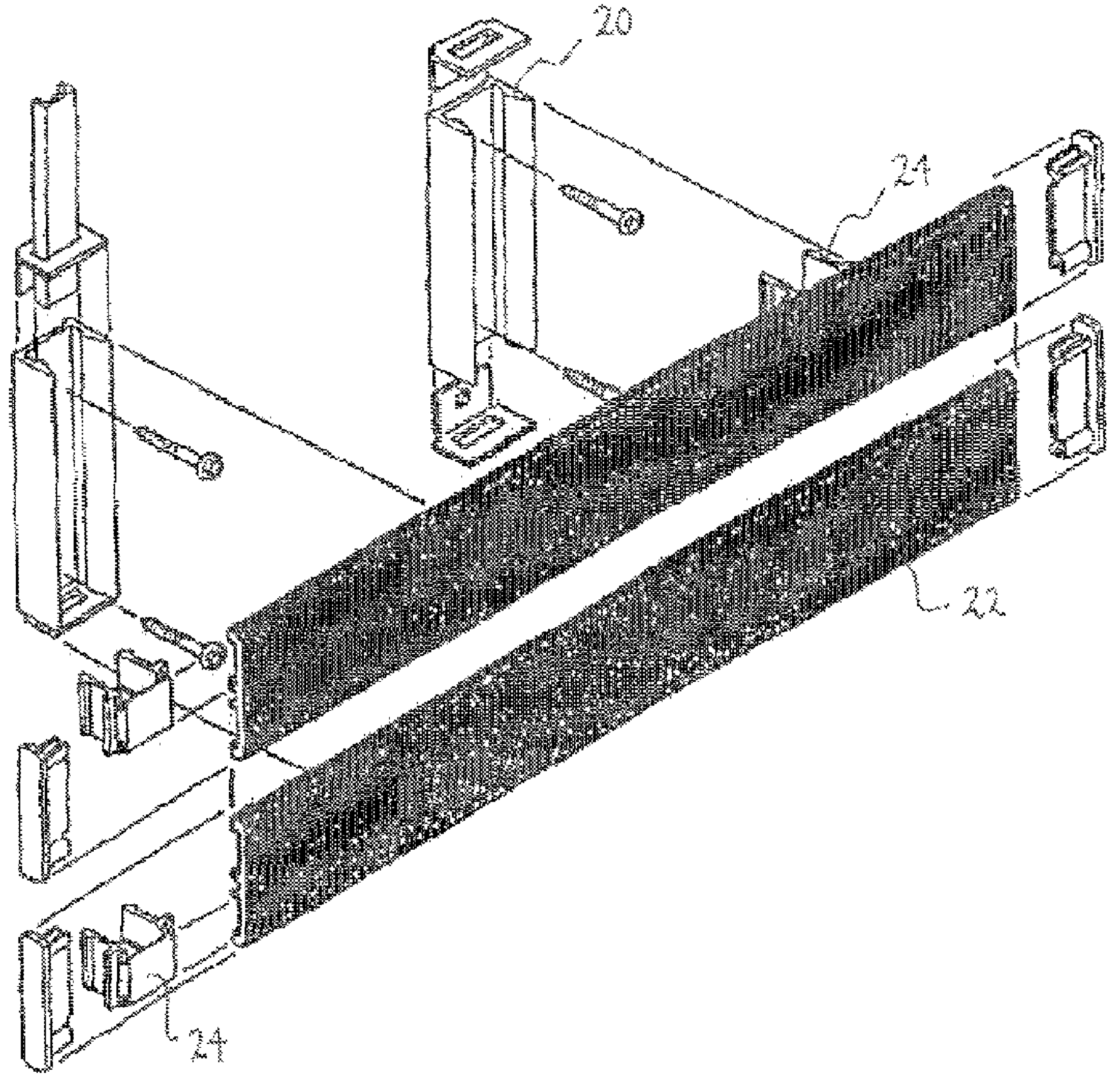
Fig. 1 (Prior Art)
FIG. 1 shows one prior art sign system.
Figure 2A:
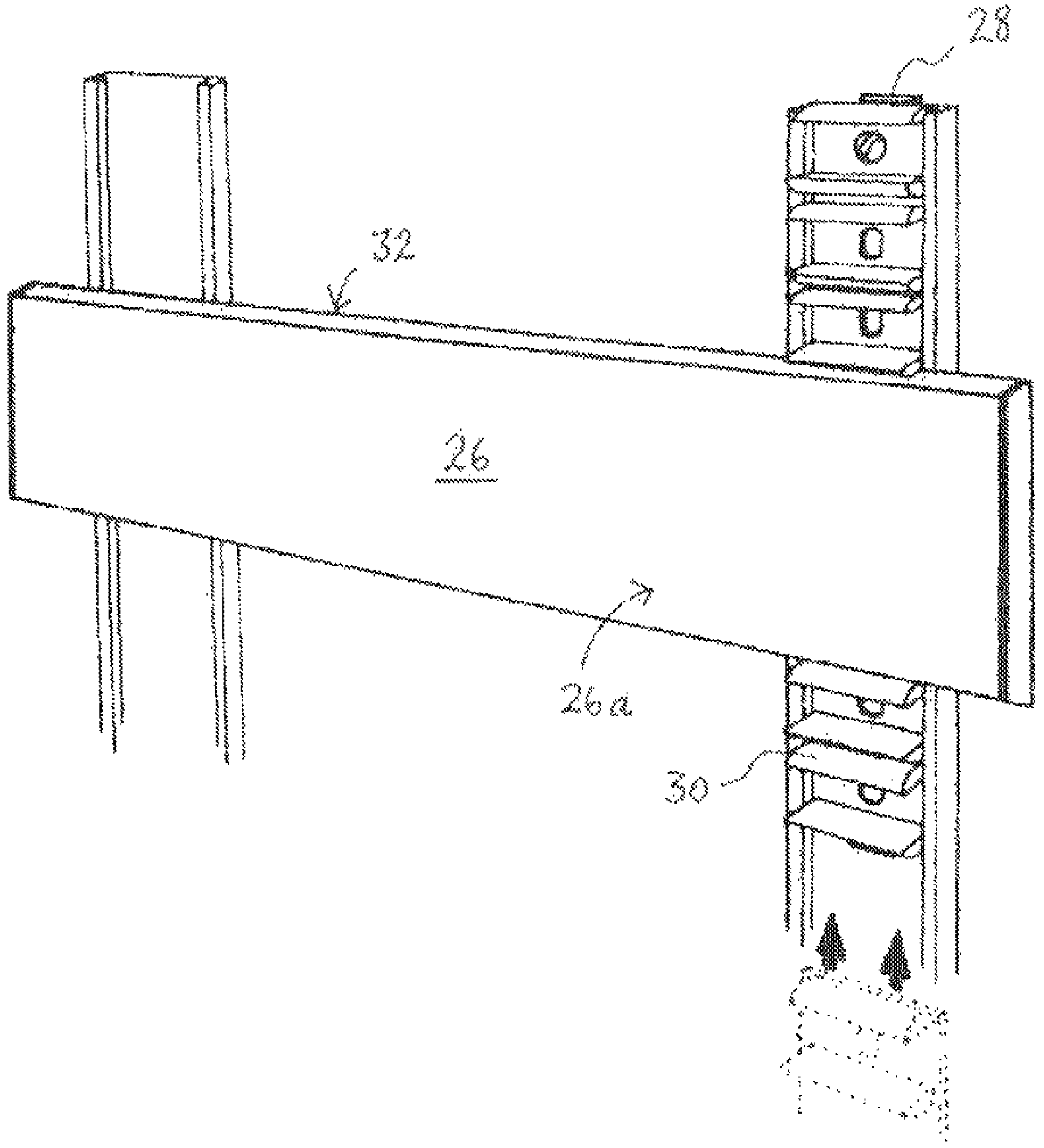
FIGS. 2A and 2B show the front perspective view and cross sectional view of another prior art sign system.
Figure 2B:
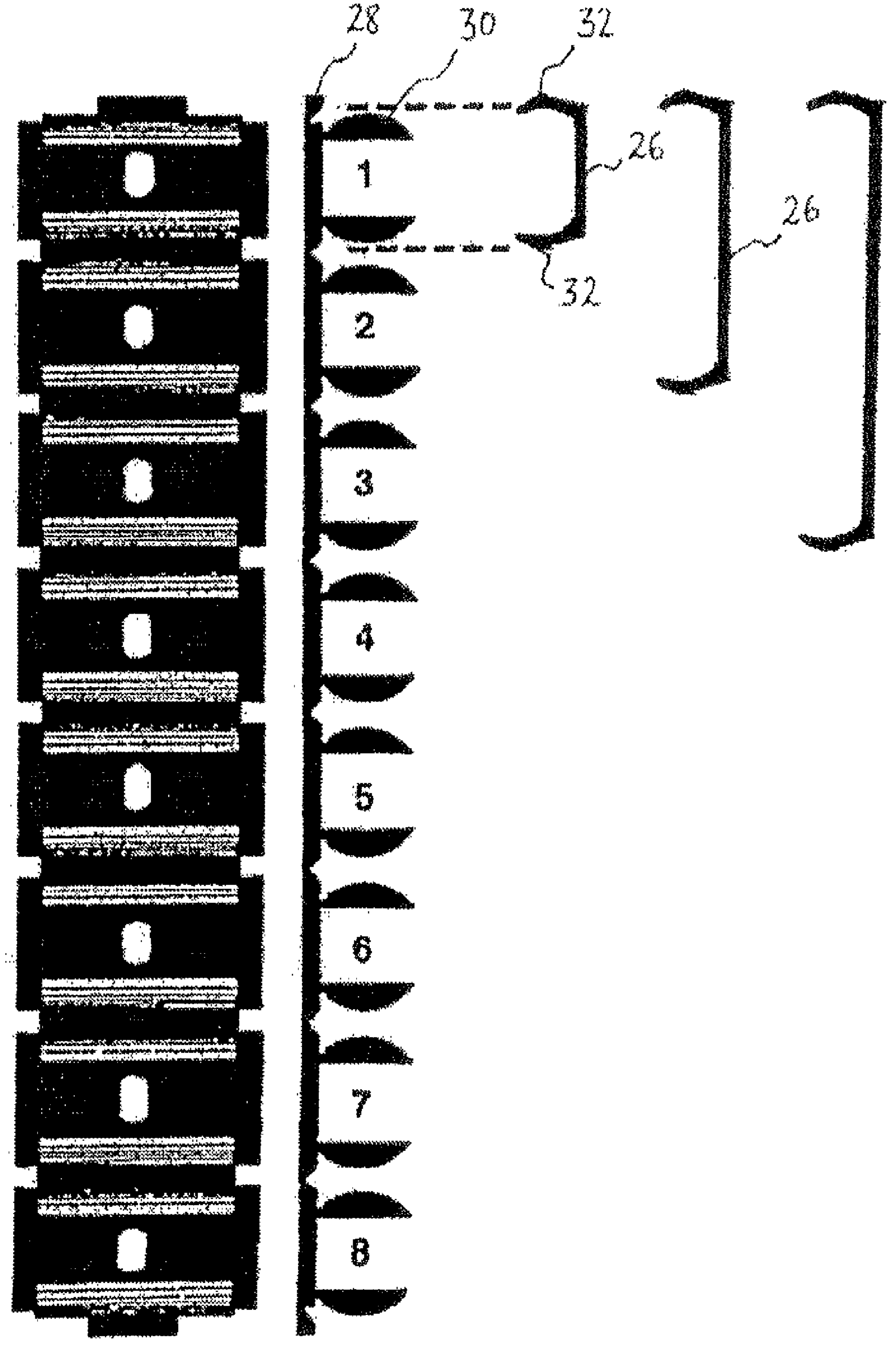
Figure 3:
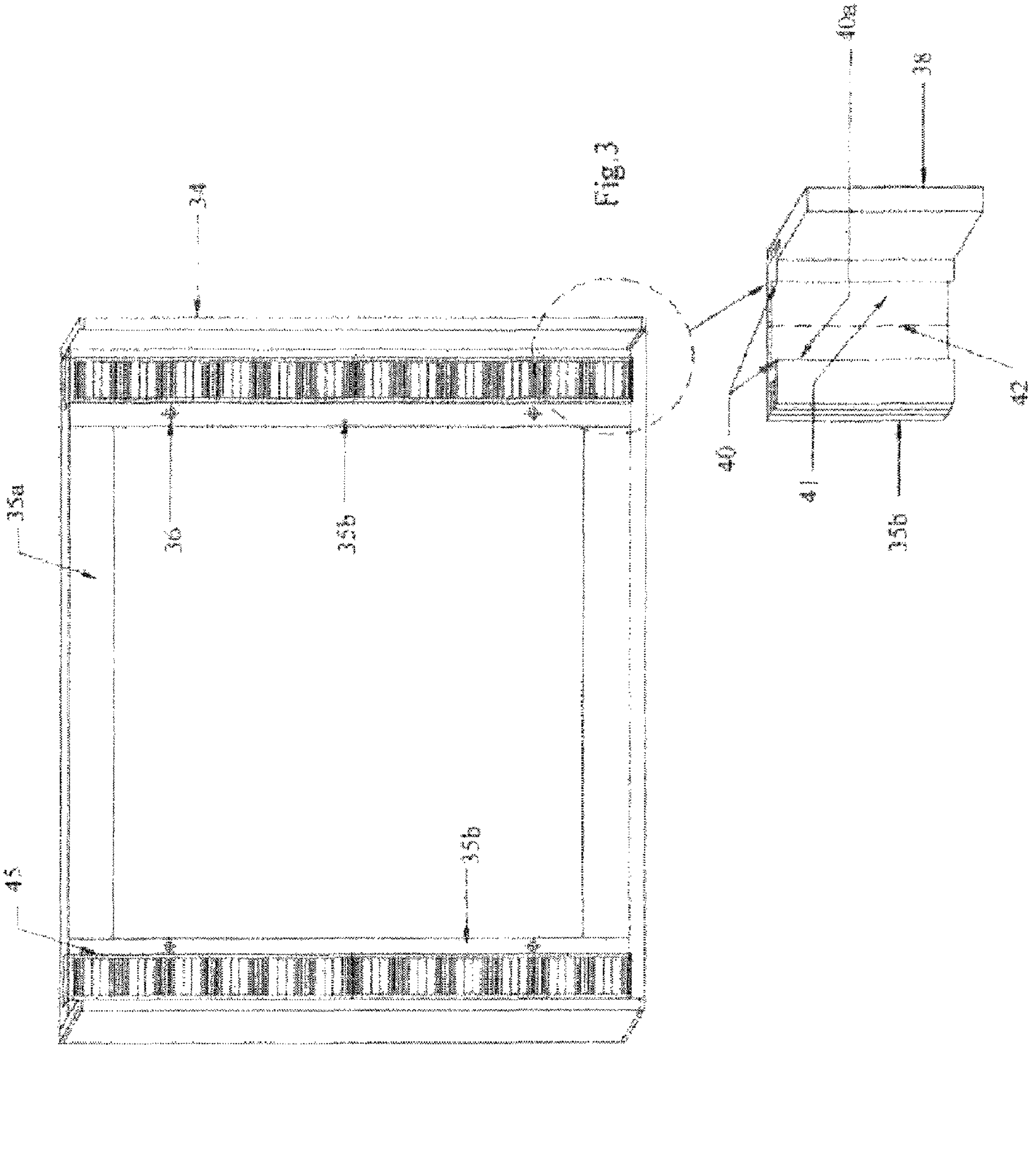

Referring first to FIG. 3, a frame according to the present invention is provided with top and bottom metal strips 35*a*, left and right side metal strips 35*b* and mounting holes 36. The left and right side metal strips 35*b* contain a supporting border 38 and two tracks 40 running parallel to the longitudinal axis (shown as dotted line 42) of the metal strip. In this embodiment, the two tracks 40 define a longitudinal space 41 therebetween with the inner edges of the tracks 40*a* provided with a beveled shape. In FIG. 3, four clamping units 45 are shown attached to the frame with two on either side of the frame. In this embodiment, the clamping units are fixed onto the frame by sliding the base of each unit (see FIGS. 5A and 5B) into the space 41 between the tracks 40.

Figures 4A, 4B, 4C, 4D, 4E:
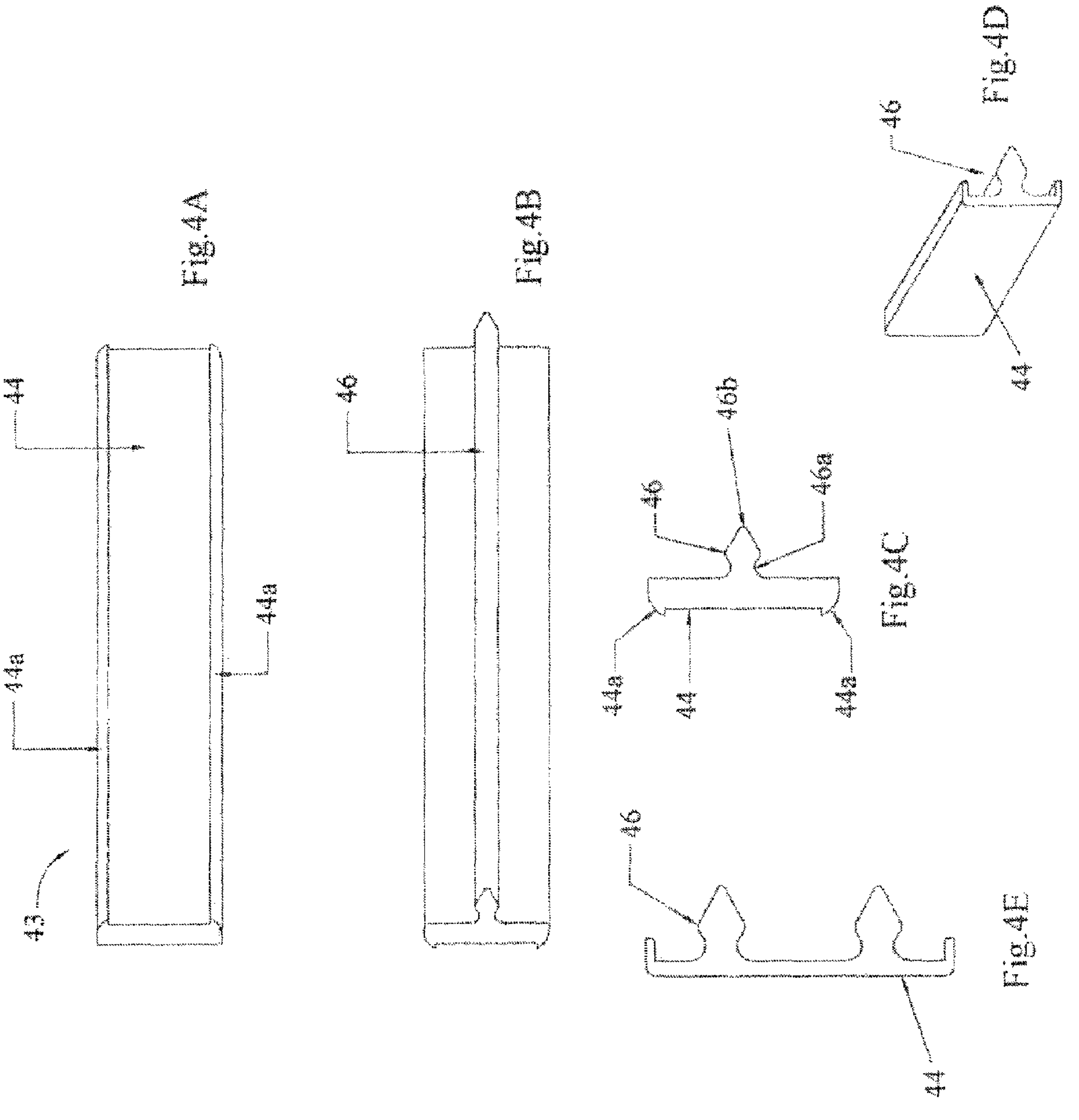
FIGS. 4A, 4B and 4C shows the front, back and traverse cross-sectional view of a sign in the form of a strip according to one embodiment of the present invention.
FIGS. 4D and 4E show the isometric view and cross-sectional view of two other sign strips, respectively, according to other embodiments of the present invention.

Turning now to FIG. 4A to 4C, a sign strip 43 according to the present invention is provided with a front illustration surface 44 on which the content of the sign, such as the name of the company, can be fixed. In this embodiment, the two longitudinal edges 44*a* of the front side of the sign are raised such that a display sheet may be embedded into the front surface of the sign without the edges of the display sheet showing or being exposed. The back of the sign is formed into a ridge that spans across the entire length of the sign along the center and longitudinally.

In the embodiment shown in FIG. 4C, the ridge 46 is of a general shape of a diamond, with the proximal end of the diamond shape pointing towards the sign strip and formed into a neck 46*a*. The distal end of the ridge 46*b* is provided for interaction with the clamping unit as shall be shown below. The ridge is preferably formed as an integral part of the sign strip using, for example, extrusion of aluminum strips.

Figure 5B:
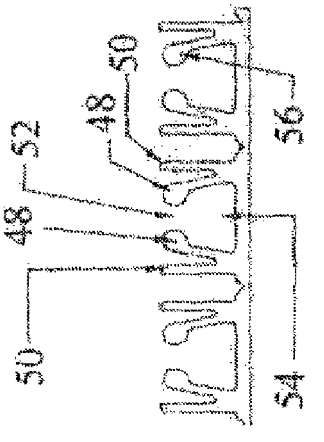
FIG. 5B shows the longitudinal cross-sectional view across line A-A of the clamping units of FIG. 5A.
Figure 5A:
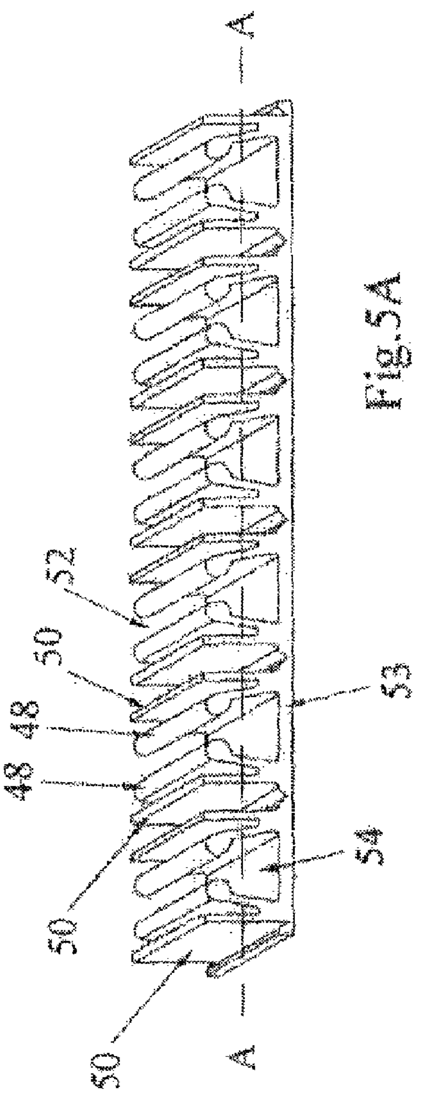
FIG. 5A shows the top perspective view of a plurality of clamping units according to one embodiment of the present invention.

Referring to FIGS. 5A and 5B, a series of clamping units may be fixed onto the frame contiguously (only the units are shown in FIGS. 5A and B for ease of description). The clamping units of the preferred embodiment each contain a pair of clamps 48 within a pair of struts 50. The clamps protrude from the base 53 at an inclined angle and tilting towards each other to create a narrow entrance 52 with an expanding space 54 therebetween. Also in the preferred embodiment, the distal ends of the clamps are formed into a barrel shape 56. The struts in this embodiment point perpendicularly from the base.

Figure 6C:
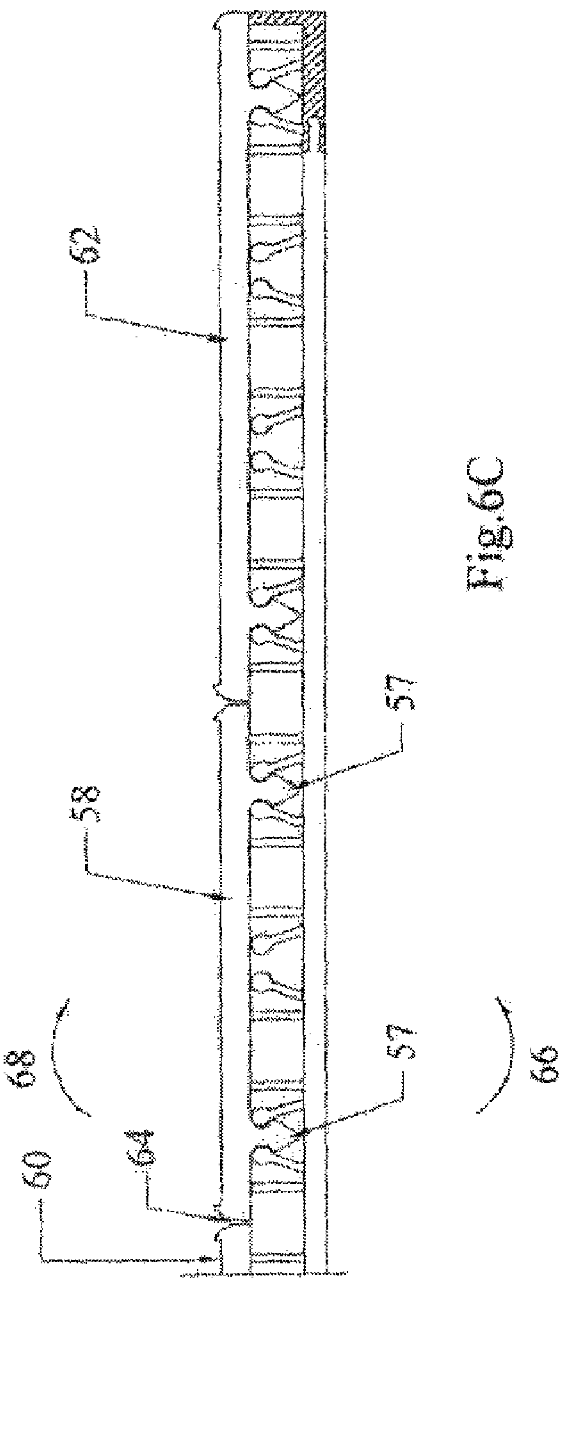
FIG. 6C illustrates the interaction between the clamping units and the ridge of the sign strip when the ridges are mounted onto the clamping units.
Figure 6B:
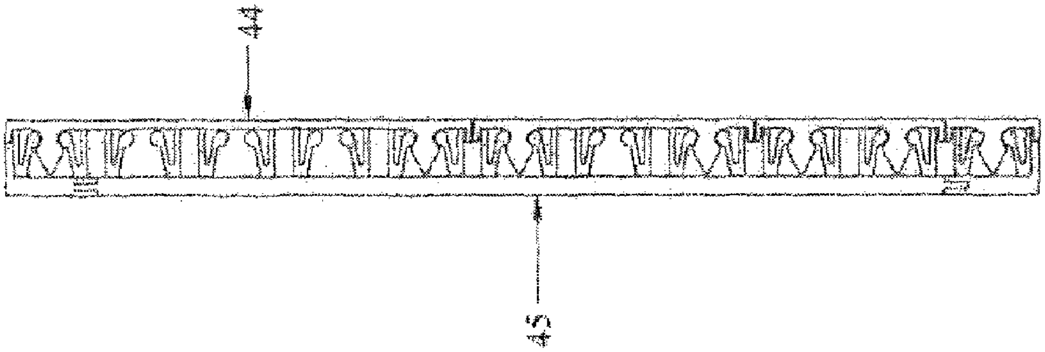
FIG. 6B is a cross sectional view across lines B-B of FIG. 6A.
Figure 6A:
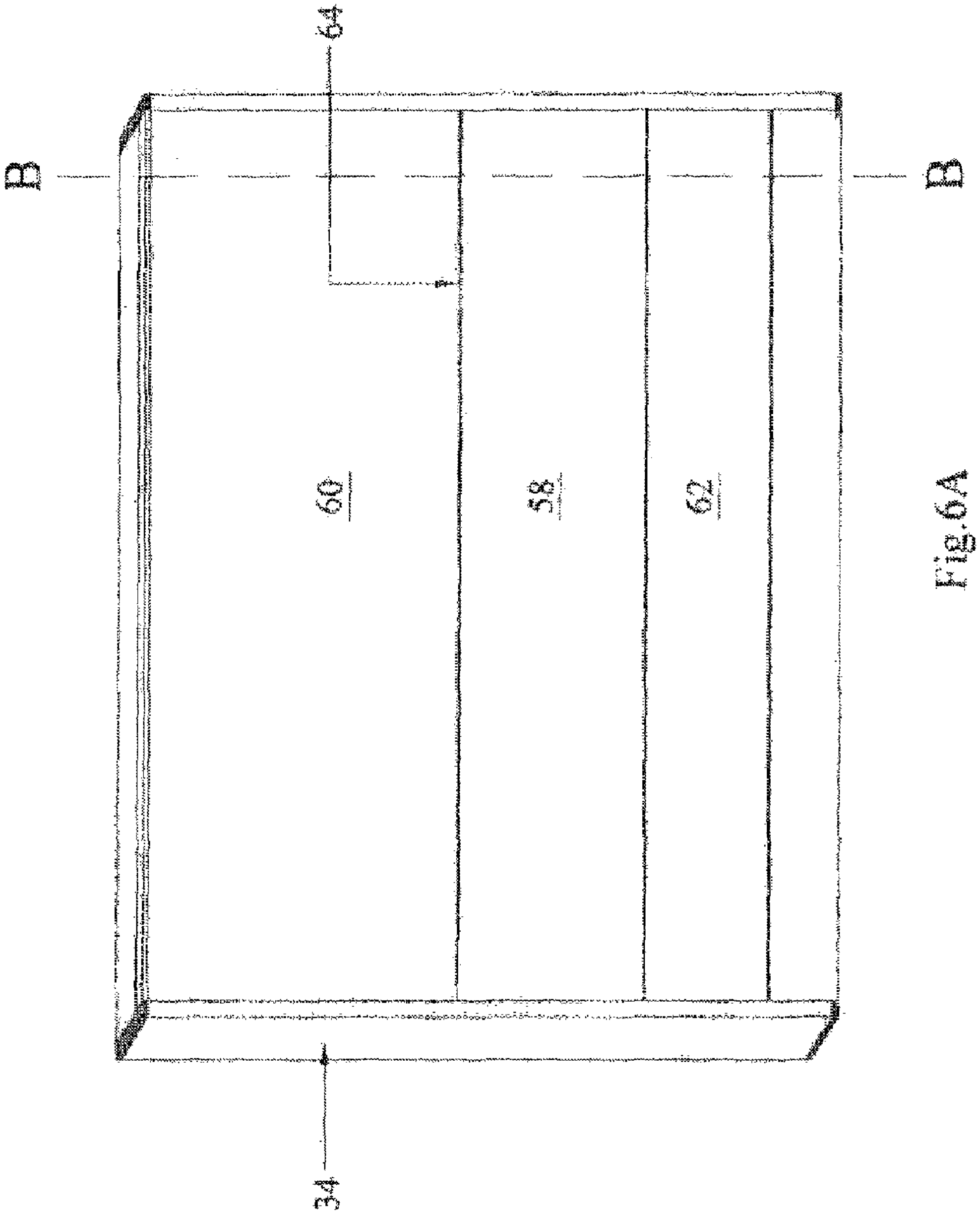
FIG. 6A is an isometric view of a sign system according to the present invention with the sign attached to the frame.

During the attachment process, the ridge 57 of the sign strip 58 is fitted into the space 54 of the clamping unit through entrance 52 as shown in FIGS. 5A, 5B and 6C. In this embodiment, the sign strip contains two ridges running in parallel along the entire length of the strip and at a distance from the edge of the strip. Due to the barrel shape of the distal end of the clamp, the neck of the ridge is firmly gripped by the clamp, while the enlarged space 54 created by the inclined angle accommodates the diamond-shaped head with ease without creating outward pressure to the clamping pair once the corresponding section of the ridge is inserted. The inclined angle of the clamps also creates a resilience force on opposing sides of the neck to ensure exceptional security once the sign is fixed. Also shown in FIG. 6A are two other sign strips 60 and 62 juxtapose strip 58. In this preferred embodiment, a narrow gap 64 of 0.5 mm is provided between each sign strip.

When a user wishes to disengage the sign strip from the frame, for example for changing or cleaning, a thin rigid sheet may be inserted into gap 64 in between two strips to pry away the strip. In the preferred embodiment, the prying force is applied toward the frame and in a rotational manner (shown by arrow 66 in FIG. 6C) resulting in strip 58 being pried out of the clamps in a rotational movement as shown in arrow 68. Since the gripping force of the clamps (on opposing directions along line A-A) is along the same direction as the prying force shown by arrow 66, the prying force directly reduces the clamping force of the clamps, thereby reducing the force required to pull the sign from the frame.

Also in the preferred embodiment, the thin rigid sheet has a working thickness equal to the width of the gap for example, 0.5 mm following the example of the preferred gap described above. Most preferably, at least one edge of the rigid sheet is beveled with the thinner side having a thickness of, for example, 0.3 mm, such that it can be easily inserted into the gap 64 between two strips.

The preferred embodiments of the present invention are thus fully described. Although the description and drawings referred to particular embodiments, it will be clear to one skilled in the art that the present invention may be practiced with variation of these specific details. Hence this invention should not be construed as limited to the embodiments set forth herein.

For example, the frame is described to have metal strips but any other materials may be used according to the preference of the user, such as wood or plastic. The signs shown and described are strips but the signs may clearly be of many other shapes. Furthermore, the strips may be fixed to the frame vertically.

The sign strips are described to contain raised edges 44*a* that act as margins to assist a user in aligning the display sheets (such as company name) flush against the edge of the strip during the in-laying process before it is fixed or glued thereon. The raised edges may also protect the edges of the display sheet pasted onto the front surface 44 of the strip from being inadvertently lifted. However, the raised edges are only a preferred embodiment, and the same invention may be practiced without these raised edges. Furthermore, other shapes of the sign strip may also be used, two examples of which are illustrated in FIGS. 4D and 4E. For ease of illustration, the same corresponding parts are given the same reference numerals.

The display sheets are described as being metallic. Some examples of metallic sheets are aluminum plates, Aluma Jet or Metalphoto plates. However, it is clear that they can be made from any material, including but not limited to non-metallic material such as silk screen panels, plastic sheets, etching panel etc. These sheets or panels are not necessarily flat, and may even be raised or embossed, according to the user's requirements.

The gap in between strips is described as preferably 0.5 mm. This dimension is for illustration only and should not be construed to limit the scope of the claims. A narrow gap of 0.5 mm or less provides a desirable appearance for some, but if another user prefers a much larger gap, the present invention can also be practiced accordingly.

The ridge is described as having a "diamond shape" in the preferred embodiment simply for ease of description. It would be understood that any other shape with a restriction at the attachment site to the sign may act as the neck to receive the distal edge of the clamp. The distal edges of the clamps are described as being barrel or cylindrical in shape. Again, it is clear that this is only one embodiment of the present invention, and that any other shapes providing an enlarged edge would fall within the scope of the present invention.

Clamping units are described to have struts but the clamps can function without them. The struts are provided to ensure that the signs do not tilt or rotate according to the direction shown in arrow 68 or 66. Using the struts, all the sign strips lying across the front of the frame will run on the same plane, giving a very neat appearance. Each clamping unit is described as containing one pair of clamps and one pair of struts, but it is clear that a plurality of pairs of clamps and struts may be formed into one strip as a clamping unit, depending on the size of the frame and sign, and the requirements of the users.

What is claimed is:

1. A sign system comprising:

a) a frame comprising at least two mounting strips running substantially parallel to each other;

b) at least one sign strip with a front side and a back side, said sign strip having at least one protruding ridge extending continuously along a longitudinal length of the back side from one end of the sign strip to an opposite end of the sign strip, said ridge having a narrow neck portion proximate said back side;

c) a plurality of clamping units disposed along a length of said mounting strip, each clamping unit comprising a pair of clamps, a base and a pair of struts, each said clamping unit fixed onto said at least two mounting strips, each of said clamp protruding from said base at an inclined angle and tilting towards the other clamp in the pair to create a pair of opposing clamping forces in a direction parallel to the longitudinal axis of said mounting strips, the clamps further terminating in an enlarged barrel shape, creating a narrow entrance with an expanding space therebetween to receive and clasp said ridge such that said ridge is inserted into the expanding space with the neck extending through the narrow entrance to reversibly but securely fasten said sign strip in a perpendicular direction to said mounting strip; said pair of clamps provided within said pair of struts with each said strut extending and pointing perpendicularly from said base wherein two struts are interposed between each said pair of clamps along said base.

2. The sign system according to claim 1 wherein said mounting strip comprises a pair of tracks extending along a longitudinal length of said mounting strip, inner edges of said tracks further provided with a beveled shape, said tracks defining a longitudinal space therebetween, said base slidably mounted into said longitudinal space of at least one of said mounting strips to fix onto said frame, said struts adapted to abut against said sign strip when said ridge is fastened to said clamps such that said sign strip is in a desired alignment position.

3. The sign system according to claim 1 wherein:

d) a traverse cross section of said ridge is in a general shape of a diamond with one end of said diamond extending into the sign to form said neck;

e) said clamps having a proximal end attached to said base and a distal end gripping said neck of said ridge, said distal end further terminates into an enlarged cylindrical shape.

4. The sign system according to claim 2 wherein said inner edge extends from one end of said track to an opposite end of said track.

5. The sign system according to claim 1 wherein said plurality of clamping units are fixed onto said mounting strip contiguously, and adjacent clamping units are separated by a space between two directly adjacent struts.

6. The sign system according to claim 1 wherein each said strut is horizontally parallel and aligned to each said clamp and has a length identical to each said clamp.

* * * * *